United States Patent [19]

FitzPatrick et al.

[11] Patent Number: 4,710,222

[45] Date of Patent: Dec. 1, 1987

[54] METHOD FOR REMOVAL OF PLUTONIUM IMPURITY FROM AMERICIUM OXIDES AND FLUORIDES

[75] Inventors: John R. FitzPatrick; Jerry G. Dunn; Larry R. Avens, all of Los Alamos, N. Mex.

[73] Assignee: The United States of America as represented by the United States Department of Energy, Washington, D.C.

[21] Appl. No.: 14,324

[22] Filed: Feb. 13, 1987

[51] Int. Cl.$^4$ ..................... C22B 60/02; C01G 56/00
[52] U.S. Cl. ............................. 75/84.1 R; 75/84.1 A; 204/157.48; 423/19; 423/250; 423/251
[58] Field of Search ..................... 423/3, 19, 250, 251; 75/84.1 R

[56] References Cited

U.S. PATENT DOCUMENTS

| | | | |
|---|---|---|---|
| 3,804,939 | 4/1974 | Strickland et al. | 423/251 X |
| 4,105,746 | 8/1978 | Compton et al. | 423/251 |
| 4,434,137 | 2/1984 | Stoll et al. | 423/251 X |

OTHER PUBLICATIONS

*Chem. and Engin. NEWS*, p. 16, Dec. 22, 1986.
Iu. V. Drobyshevskii, V. N. Prusakov, V. F. Serik and V. B. Sokolov, "Some Interaction Characteristics of the Compounds of Actinide Elements with Krypton Difluoride in Hydrogen Fluoride", Radiokhimiia, vol. 22, No. 4, 591–594, (1980), (Los Alamos National Laboratory Report LA-TR-81-11, translation dated Jun. 1981).

*Primary Examiner*—John F. Terapane
*Assistant Examiner*—Virginia B. Caress
*Attorney, Agent, or Firm*—Samuel M. Freund; Paul D. Gaetjens; Judson R. Hightower

[57] ABSTRACT

Method for removal of plutonium impurity from americium oxides and fluorides. $AmF_4$ is not further oxidized to $AmF_6$ by the application of $O_2F$ at room temperature, while plutonium compounds present in the americium sample are fluorinated to volatile $PuF_6$, which can readily be separated therefrom, leaving the purified americium oxides and/or fluorides as the solid tetrafluoride.

5 Claims, No Drawings

METHOD FOR REMOVAL OF PLUTONIUM IMPURITY FROM AMERICIUM OXIDES AND FLUORIDES

This invention is the result of a contract with the Department of Energy (Contract No. W-7405-ENG-36).

BACKGROUND OF THE INVENTION

The present invention relates generally to a method of selective fluorination of actinide species, and more particularly to the removal of plutonium impurity from americium using fluorine gas followed by $O_2F$.

Americium is a by product of plutonium production, and is currently extracted from solutions of plutonium feedstock material by a peroxide precipitation process. However, the americium recovered by this process contains between approximately 1 and 20% of plutonium. Excess peroxide is subsequently neutralized by addition of caustic, forming thereby polyhydroxides of americium. Further purification is required to reduce the plutonium impurity to an acceptable 5000 ppm level. This is accomplished by dissolving the impure americium hydroxides in nitric acid an passing the resulting solution through ion-exchange material wherein the plutonium is preferentially fixed while the americium remains in solution, thereby passing through the exchange material. To produce metallic americium, the processed americium solution is mixed with oxalic acid to precipitate the americium as americium oxalate which is then calcined at about 450° C. to yield $AmO_2$. The oxide material may then be reduced to the metal. Of interest is a less complicated procedure for further reducing the plutonium content of americium.

Accordingly, it is an object of the present invention to provide a method for the reduction of the plutonium impurity content of americium.

Another object of the invention is to provide a nonaqueous procedure for reducing the plutonium impurity in americium.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method of this invention may include reacting americium oxides containing plutonium impurity with fluorine gas to produce $AmF_4$, reacting the resulting impure $AmF_4$ with $O_2F$ to produce $PuF_6$ while leaving the $AmF_4$ unreacted further, and separating the resulting $PuF_6$ from the $AmF_4$. Preferably, the step of reacting the impure americium oxides with fluorine gas is performed at substantially room temperature.

Benefits and advantages of the subject invention include the ability to reduce the plutonium impurity level in americium to acceptable concentrations in a single, simple nonaqueous step.

DETAILED DESCRIPTION OF THE INVENTION

Reference will now be made in detail to the present preferred embodiment of the invention. Briefly, our invention includes a method for removing the plutonium impurity in americium. The subject method takes advantage of the fact that $AmF_4$ is not further oxidized by $O_2F$ to $AmF_6$, while plutonium compounds present (tetrafluorides, oxyfluorides and oxides) are converted to $PuF_6$. Theoretically, it should be possible to reduce the plutonium level to less than 100 ppm from about 1-20 impurity.

Having generally described the present invention, the following specific examples are given as a further illustration thereof.

EXAMPLE I

Fluorination of $AmF_4$ using both $F_2$ and $O_2F$:

A 0.558 g sample of pure americium oxide was placed in a passivated, sintered monel filter cup having a 60 micron pore size and designed such that all gases passed therethrough come into contact with the sample located therein. The conversion of $AmO_2$ to $AmF_4$ was effectuated using a mixture of 100 torr of fluorine and 100 torr of argon, which was permitted to flow over the sample for approximately 12 hours, followed by 600 torr of fluorine circulated over the sample for an additional approximately 5 hours. The reaction was followed using neutron counting techniques, the neutron count rate increasing as the quantity of $AmF_4$ increases. At the termination of the reaction, the neutron count rate was observed to have doubled and the sample weight increased by 35.4 mg, about 40% of the expected weight gain. Some impurities were observed in subsequent FTIR scans and are believed to arise from residual nitrates present in the $AmO_2$.

A 0.2988 g sample of $AmF_4$, prepared as detailed in the preceding paragraph, was placed in the filter cup. A flowing (18 std-1/min), room temperature mixture of 300 torr of oxygen and 300 torr of fluorine was irradiated with a XeCl laser (308 nm, 20 Hz, 3-4 watts, 175-200 mJ/pulse) and the resulting mixture passed through the filter cup for approximately 1 hour and then into a cold trap. The residence time between the photolysis cell and the sample was between 500 and 700 ms. Uncondensed fluorine and oxygen were recirculated through the region of irradiation and the irradiated mixture continuously passed through the filter cup. No $AmF_6$ could be detected by FTIR measurements. An attempt to fluorinate a 0.5 g sample of $AmF_4$ in a sintered nickel filter cup by exposing the sample to 600 torr of $F_2$ irradiated for about 1 hour under the conditions set forth hereinabove did not produce detectable quantities of $AmF_6$.

EXAMPLE II

Fluorination of $PuF_4$ using both $F_2$ and $O_2F$:

$Pu_4$ was generated by laser photolysis of 1-2 torr of $PuF_6$ in 250 torr of argon. The $PuF_4$ was collected on a sintered nickel filter. Typical sample sizes were between 80 and 120 mg. Using similar conditions to that of the unsuccessful fluorination of $AmF_4$ described hereinabove, a 100 mg sample of $PuF_4$ was fluorinated using $O_2F$ in 5000 to 7000 laser pulses. Similar fluorinations were performed in a sintered monel filter cup using $PuF_4$ derived from hydrofluorination of $PuO_2$ using HF at 600° C., and $PuO_2$ derived from a burned anode heel, both generating $PuF_6$.

EXAMPLE III

Fluorination of a mixture of $AmO_2$ and $PuO_2$:

A 0.5 g sample of a mixture of plutonium and americium oxides (0.386 g of $AmO_2$ and 0.114 g of $PuO_2$) was pretreated with 300 torr of $F_2$ to convert the $AmO_2$ to $AmF_4$. Ater 1 hour of treatment with flowing $0_2F$ generated as described hereinabove, 0.038 g of $PuF_6$ was produced. After another hour, 0.040 g additional $PuF_6$ was generated. This latter quantity represented 46.5% removal of the plutonium present in the mixture.

EXAMPLE IV

Fluorination of a mixture of $AmO_2$ and $PuO_2$:

A 0.5 g sample of a mixture of plutonium and americium oxides (0.454 g of $AmO_2$ and 0.046 g of $PuO_2$) was pretreated with 300 torr of $F_2$ to convert the $AmO_2$ to $AmF_4$. After 1 hour of treatment with flowing $O_2F$ generated as described hereinabove, 0.011 g of $PuF_6$ was produced. After another hour, 0.006 g additional $PuF_6$ was generated. This latter quantity represented 23.9% removal of the plutonium present in the mixture.

In summary, $AmF_4$ does not oxidize to $AmF_6$ under the conditions described, while $PuF_4$ and $PuO_2$ oxidize readily thereto.

The foregoing description of a preferred embodiment of the present invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for the removal of plutonium impurity from oxides and/or fluorides of americium which comprises the steps of:
    a. reacting impure americium oxides containing plutonium impurity with fluorine gas to produce impure $AmF_4$;
    b. reacting the resulting impure $AmF_4$ with $O_2F$ to produce $PuF_6$; and
    c. separating the $PuF_6$ from the $AmF_4$.

2. The method as described in claim 1, wherein said step of reacting said impure americium oxides with fluorine gas is performed at substantially room temperature and wherein about 300 torr of fluorine gas is employed.

3. The method as described in claim 1, wherein said step of reacting said impure $AmF_4$ with $O_2F$ includes flowing $O_2F$ prepared by irradiating a flowing mixture of oxygen gas and fluorine gas with ultraviolet radiation in the vicinity of the impure $AmF_4$ and wherein the $O_2F$ prepared thereby is flowed over the impure $AmF_4$.

4. The method as described in claim 1, further comprising pyrohydrolyzing said $AmF_4$ to produce $AmO_2$ after said step of separating the $PuF_6$ therefrom.

5. The method as described in claim 1, further comprising reducing said $AmF_4$ to produce metallic americium after said step of separating $PuF_6$ therefrom.

* * * * *